May 26, 1936.    E. A. STALKER    2,041,792
AIRCRAFT
Original Filed May 17, 1934    4 Sheets—Sheet 1

INVENTOR
Edward A. Stalker

May 26, 1936.　　　E. A. STALKER　　　2,041,792
AIRCRAFT
Original Filed May 17, 1934　　4 Sheets—Sheet 2

INVENTOR
Edward A. Stalker

May 26, 1936. E. A. STALKER 2,041,792
AIRCRAFT
Original Filed May 17, 1934 4 Sheets-Sheet 3

INVENTOR
Edward A. Stalker

May 26, 1936.　　　E. A. STALKER　　　2,041,792
AIRCRAFT
Original Filed May 17, 1934　　4 Sheets-Sheet 4

INVENTOR
Edward A. Stalker

Patented May 26, 1936

2,041,792

UNITED STATES PATENT OFFICE 2,041,792

AIRCRAFT

Edward A. Stalker, Ann Arbor, Mich.

Application May 17, 1934, Serial No. 726,113
Renewed November 29, 1935

25 Claims. (Cl. 244—12)

This invention relates to aircraft and particularly to a mode of propulsion utilizing certain properties of the boundary layer. It contains subject matter common to the applications filed November 7, 1931 and May 22, 1933, Serial Numbers 573,651 and 672,194, respectively. It is also collateral with two other applications filed herewith having Serial Nos. 726,111 and 726,112.

The objects of the invention are first to provide a mode of propulsion wherein the propulsive jet or jets are stratified as to velocity while flowing about the aircraft or its parts; second, to provide efficient means of creating a high lifting capacity for landing; third, to provide a type of wing which in conjunction with the mode of propulsion will entail very small rotations of the aircraft, if any; fourth, to provide a wing capable of enclosing the cargo space to form a so-called flying wing; fifth, to apply to this type of wing a type of internal propulsion utilizing the properties of the boundary layer. Other objects will appear from the following descriptions and drawings.

Figure 12:
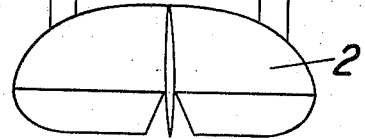
Figure 13:
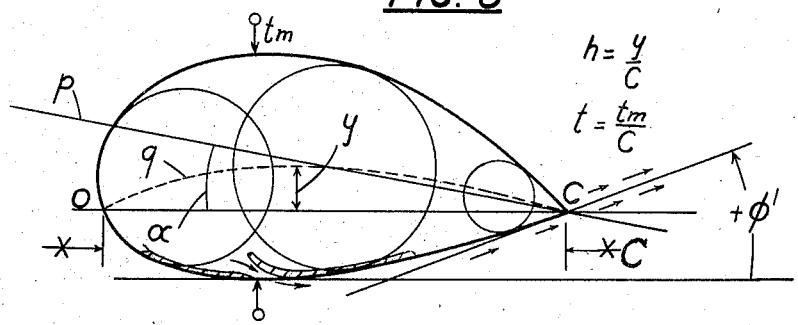
Figure 14:
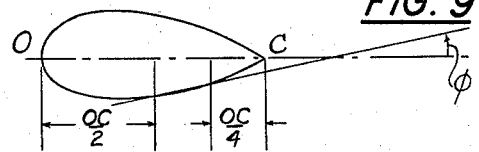

Before proceeding with a detailed description of the invention pertinent phases of the underlying theory are given with reference to Figures 12 to 14.

In discussing wings, it is convenient to refer their lift L and drag D to coefficients which are independent of the area A, the density of the air $\rho$ and the speed of the relative wind V. These coefficients are $$\text{Lift coefficient } C_L = \frac{2L}{\rho A V^2} \quad (1)$$

$$\text{Drag coefficient } C_D = \frac{2D}{\rho A V^2} \quad (2)$$

When fluid flows across a body the velocity at the surface of the body is zero and it is some distance out from the body that the full velocity of the local stream is attained. If the body is curved the loss in energy due to friction along the forward portion is such that when the flow reaches the locality where the body begins to contract in cross sectional area the flow leaves the body and a turbulent wake appears which increases the drag of the body greatly. The layer of air retarded by friction is called the boundary layer. If sufficient energy is added to the boundary layer it will not leave the surface but will follow smoothly along it with a consequent reduction in drag. The amount of energy needed is small in comparison with the reduction of drag. The process is called the energization of the boundary layer.

The boundary layer may be energized either by blowing along the surface rearward so as to accelerate the boundary layer, or by drawing the boundary layer into the body. In both cases energy is added to the layer and in both cases the layer is suppressed.

Only where there is a contraction in the cross section of the body, or where a surface is curved away from the flow is boundary layer energization useful. On a flat surface curving toward the flow there is no reduced pressure area to cooperate with the loss of energy due to rubbing and thereby cause the flow to separate from the body. A jet discharged along a flat pressure surface will not reduce the drag but will actually increase it if the jet speed is higher than the relative wind because of the added friction arising from the greater velocity of the jet. Since aerodynamic bodies have sides which become nearly flat to the rear of a point two-thirds of the length back from the nose or forward end, the slot or opening should be ahead of this point. By side surface of the aircraft I mean any portion of the surface whose normal to the surface is directed more across the relative wind than along it. Thus the major portion of the upper and lower surfaces of the wings are side surfaces, as also are the top and bottom or lateral faces of the fuselage.

Although the use of boundary layer energization increases the maximum $C_L$, the value occurs at a very large angle of attack. In fact the angle is increased proportionately (very closely) to the increase in $C_L$. For instance, in a present day wing, the range of angles from zero to maximum lift is about 20 degrees but if the maximum lift coefficient were increased 50 per cent, the angular range would be about 30 degrees. A quadrupling of the lift coefficient would make the angular range 40 degrees. This would be an unbearably high rotation for the passengers. I employ means to eliminate the necessity of the high rotation.

Aerodynamic theory teaches that the lift of a wing arises from a flow about it that may be divided into two components: a rectilinear flow and a circulation flow, as shown in Figure 12. The strength of the circulation flow is defined as the integral of $V_1 ds$, the circulation velocity $V_1$ taken around the curve S. The strength of the circulation indicated by $\Gamma$ is the same for all closed circulation lines S about the wing. The lift coefficient per foot of span is then $$C_L = \frac{2\Gamma}{CV} \quad (3)$$

where $$\Gamma = \int_S V_1 ds \quad (4)$$

and no allowance is made for tip loss. To include the loss the value of $C_L$ should be multiplied by $\pi/4$.

I have found it possible to impose a negative circulation on the wing and thereby reduce the lift without changing the apparent angle of attack. Imposing a negative circulation is equivalent to decreasing the angle of attack. In fact the airstream is deflected down and the true angle of attack is decreased. Thus the great rotation of the passengers is eliminated.

I find that, although a negative circulation may be imposed about any wing by blowing out a suitably formed slot in the surface, certain airfoil sections and certain slot locations have the greatest effect.

The mass of air ejected from the slot is itself appreciable in comparison to the mass of the outside air affected by the wing. Hence if the ejected air has a final downward component of velocity it will give an appreciable lift. This lift will in part counterbalance the lift reduction from the negative circulation. This condition would obtain, for instance, if the slot were located in the lower surface of a wing having a flat under surface because at large angles of attack this surface is inclined downward. A jet emitted rearward along the under surface to induce a negative circulation would also have a downward component at the trailing edge and therefore lift. A surface concave upward would cause a still greater downward component. On the other hand a convex lower surface as shown in Figure 13 will give rise to an upward component of velocity at the trailing edge so that the reaction of the discharged jet is downward and therefore aids in decreasing the lift. Thus the effects are additive and it is for this reason that I prefer double convex wing or airfoil sections. The degree of convexity may be readily designated.

In Figure 13 determine the means camber line $q$ by the usual method of inscribing circles and drawing the line through the centers of the circles. This is line $q$. The chord line is the line subtending the mean camber line or arc. A line drawn through the mid point of the mean camber line determines the wind direction for zero lift quite closely as is well known. This is the zero lift line $p$. The maximum ordinate of the mean camber measured from the chord line is best given as a fraction $h$ of the chord length $oc$. It is also best to express the thickness $tm$ as a fraction $t$ of the chord.

It is desired that at large angular settings of the wing the air blown out the lower surface will have an upward component. It would be logical then since the flow follows the under surface to have such a contour that the tangent to the trailing edge makes a positive angle $\phi'$ with the relative wind direction. See Figure 13. When proceeding at high speed the chord line of the wing will be inclined up at the leading edge and the main jet flow will be discharged from the under surface and should have an upward component finally if $\phi'$ is large enough. However, since a portion of the rear end of the wing may be chopped off or deformed greatly without appreciably altering the aerodynamic characteristics of the wing, and because in actual practice the trailing edge always terminates with an appreciable thickness, the tangent at the trailing edge cannot be stated unambiguously. It is better to use a line defined by offsets to the lower surface contour over the rear half of the wing which is the half which determines by its mean effect the direction of the jet flow. In Figure 14 locate a point on the lower contour opposite the mid point of the chord and a point on the contour opposite the three-quarter point of the chord. A straight line $m$ drawn through these contour points will be unambiguous and will indicate the mean direction of flow. Measure $\phi$ between this line and the chord line. This angle preferably should be greater than the maximum lift angle measured with the zero lift line $p$. For any value of $h$ it may be shown that the maximum lift coefficient is $$C_{L\max}=(0.9+9h) \qquad (5)$$

and since $$\alpha_{\max}=\frac{d\alpha}{dC_L}C_{L\max}+4 \qquad (6)$$

$$\alpha_{\max}=(0.9+9h)\frac{(\pi R+5.35)57.3}{5.35\pi R}+4 \qquad (7)$$

in degrees.

Since $\alpha$ will decrease with an increase in R and increase with $h$ the preferred values may be stated in terms of the product of R by $h$ which should be equal to or greater than 0.40. That is, $$Rh \geqq 0.40.$$

It is well known in aerodynamic theory that the reciprocal of the slope of the lift curve in radian measure is $$\frac{d\alpha}{dC_L}=\frac{\pi R+5.35}{5.35\pi R} \qquad (8)$$

where R is the aerodynamic aspect ratio and $\pi$ has its usual significance. Then the angle $\phi$ is best stated as greater than $\alpha$ max of Equation 7. The upper limit will be determined by the values of $t$ and $h$ to be given later. The aerodynamic aspect ratio is well known to be $$\frac{(kS)^2}{(nA)}$$

where $k$ is the effective span factor and may be found in aeronautical books for various combinations of wings and for end shields. S is the wing span and $n$ is the number of wings.

In addition to defining the lower contour of the wing as above, I also define it as follows. The lower surface is said to be convex if the contour of the wing section has no reversal of curvature in the surface below the chord subtending the mean camber arc.

I set the wing on the landing gear so as to realize the high angle of attack and lift coefficient for landing. In the air instead of rotating the wing bodily to a small angle of attack for high speed, I rotate the wing only so much as is comfortable for the passengers and then I change the angle of attack by the ejection of the jet or sheet of fluid from the under surface.

The convex section is excellent from the point of view of inducing a negative circulation but it does not lead to quite as high values of the maximum lift coefficient as a convex-concave section, that is, a wing section having a lower contour arched upward.

A trailing edge flap depressible for landing will convert a double convex section into a section having an upwardly arched lower surface. The flap when folded against the wing will preserve the section for a strong negative circulation. I characterize a flap along the wing edges transverse to the direction of the relative wind in normal flight as a wing edge flap.

I propel the aircraft by jets blown out slots in the surface of the aircraft so that in addition to creating a propulsive thrust there is a reduction in resistance due to the energization of the boundary layer. To create a propulsive force, the mass of air is given a velocity higher than the relative flow of the atmospheric air past the aircraft. This entails additional frictional drag. It is one object of this invention to mitigate this condition.

I reduce the drag by arranging that the propulsive jet is stratified as to velocity with the higher velocity separated from the body surface by a slower stratum of fluid. It takes a considerable distance along the body surface before the slower air is accelerated by the fast moving air and so over a very large area of the surface the frictional drag is reduced.

I have described in a Patent No. 1,691,942, dated November 20, 1928, and entitled Airplane wing, how the boundary layer of a wing may be energized by the use of a prime mover actuated by the relative wind. I find that I can greatly improve the efficiency of the draft tube encompassing the turbine by the proper location of a slot directed downstream and arranged to emit fluid with an appreciable velocity along the inner surface of the tube, particularly near the juncture of throat and venturi. Thus the included angle of the diffuser may be enlarged and the tube shortened without fear that the flow will separate from the tube wall. In the conventional diffuser the included angle cannot exceed 7° without producing a large increase in resistance to flow due to the failure of the flow to follow the diffuser surface.

I attain the above objects by the means illustrated in the accompanying drawings in which—

Figure 1:
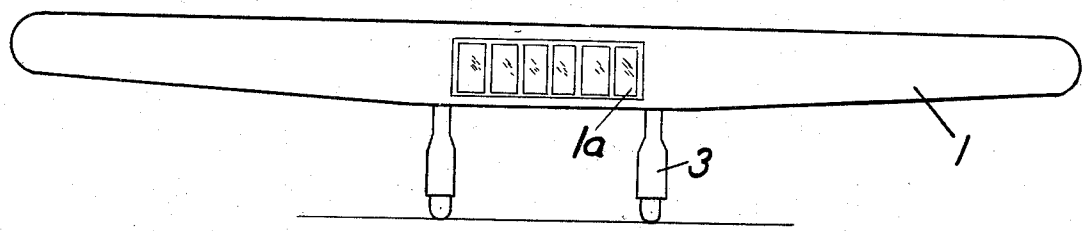
Figure 3:
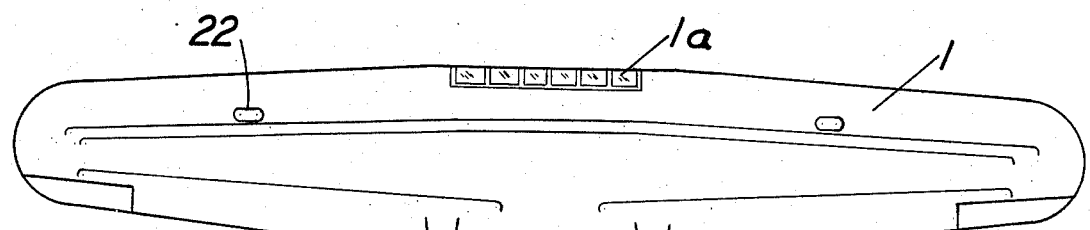
Figure 2:
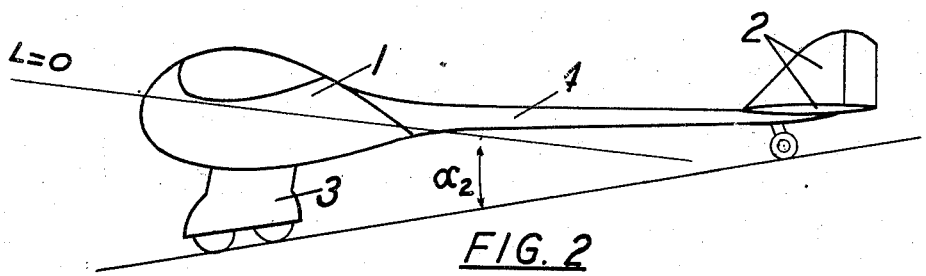
Figure 4:
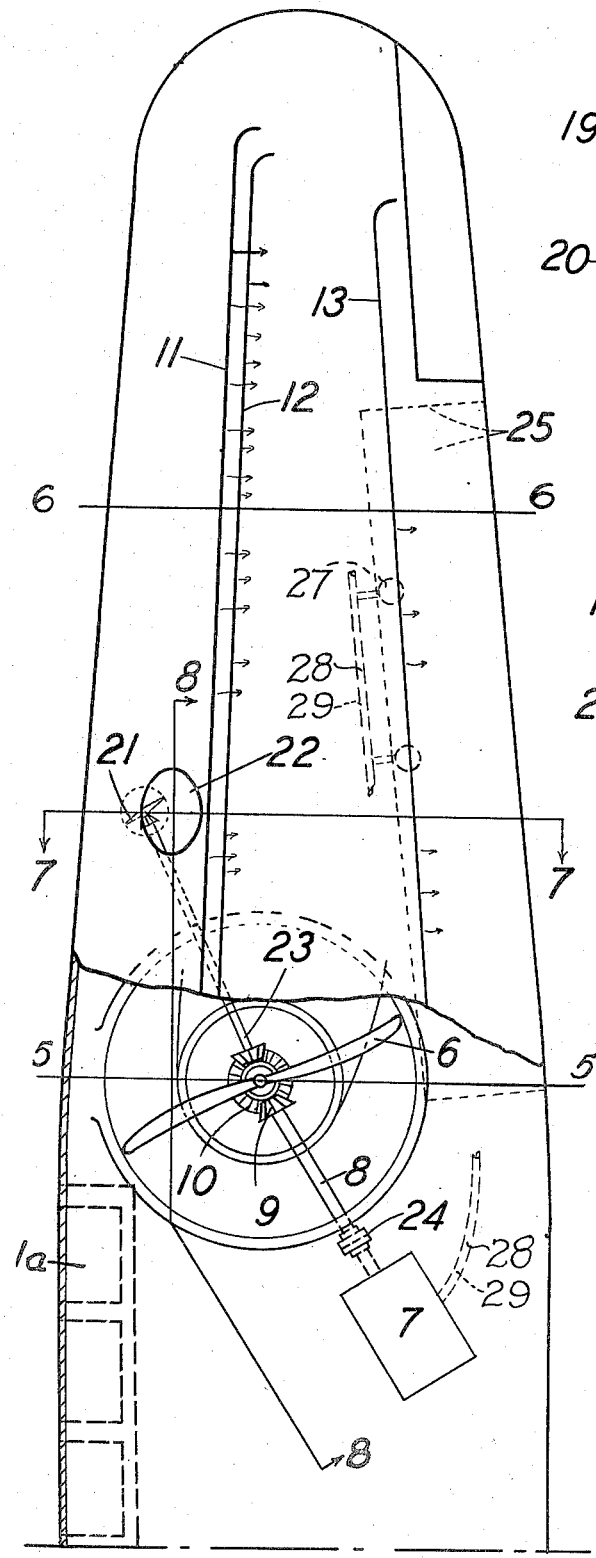
Figure 5:
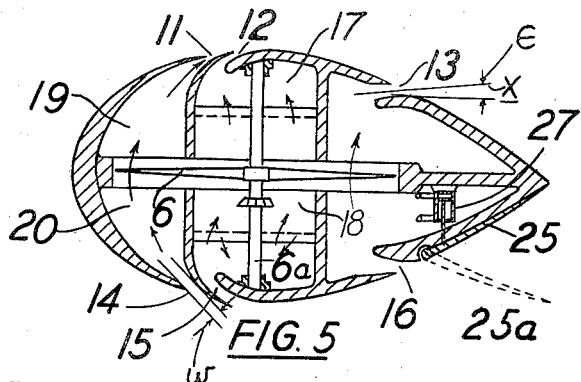
Figure 6:
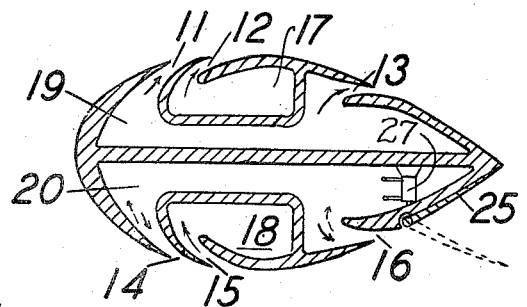
Figure 5A:
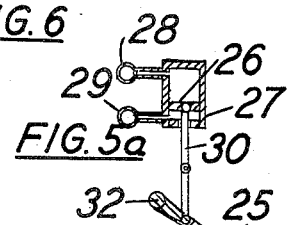
Figure 7:
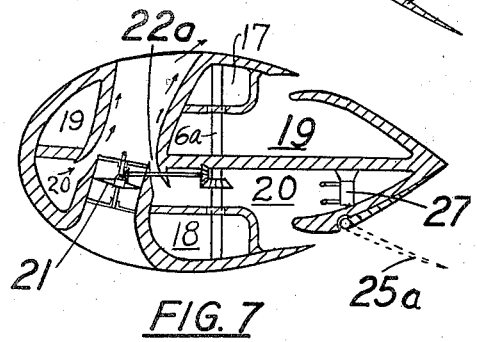
Figure 8:
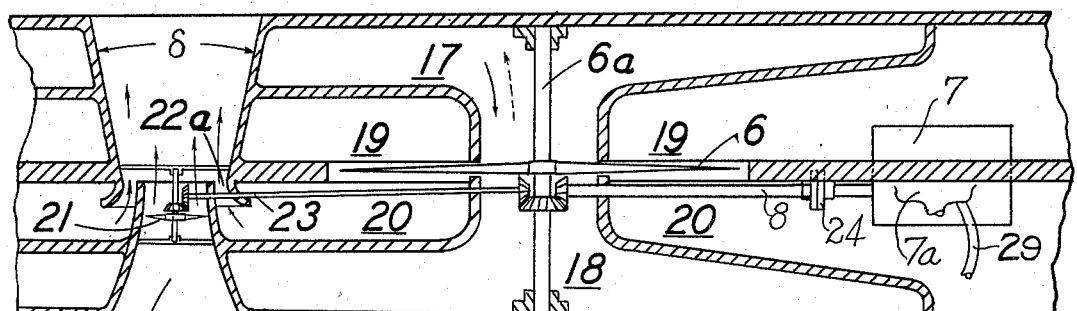
Figure 9:
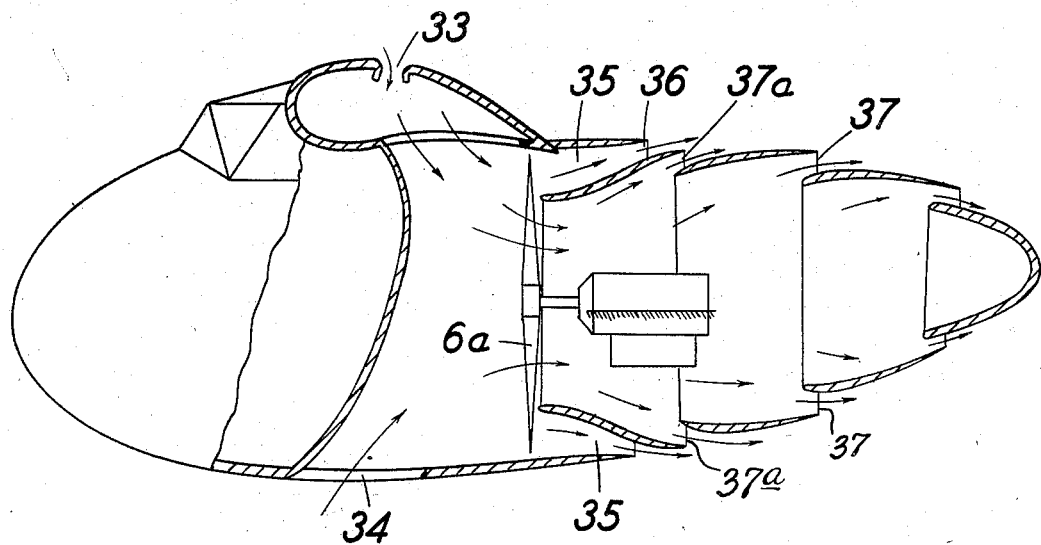
Figure 10:
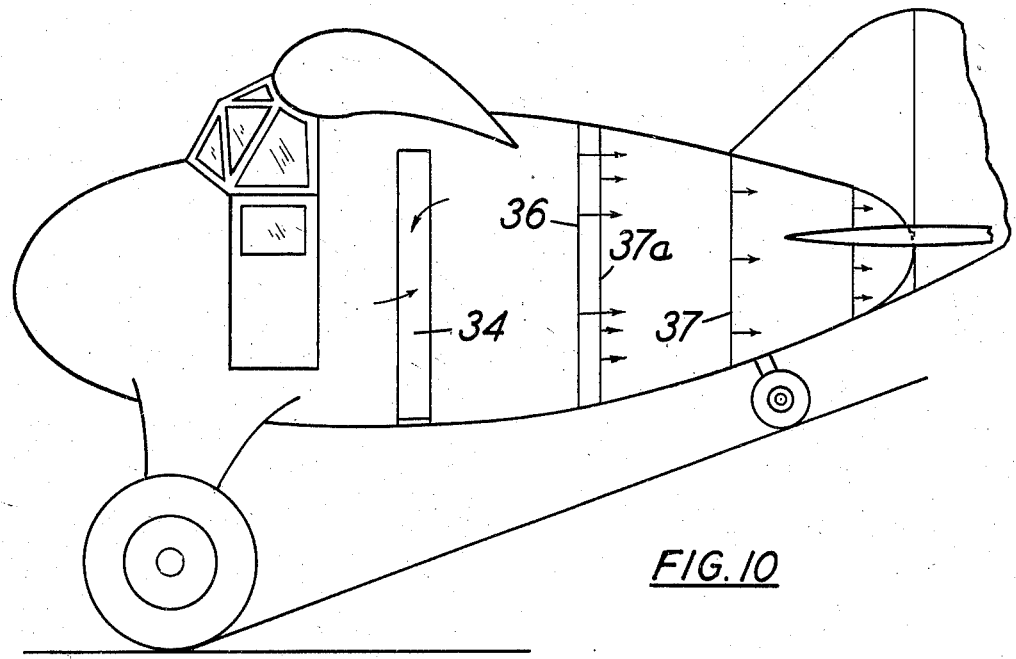
Figure 11:
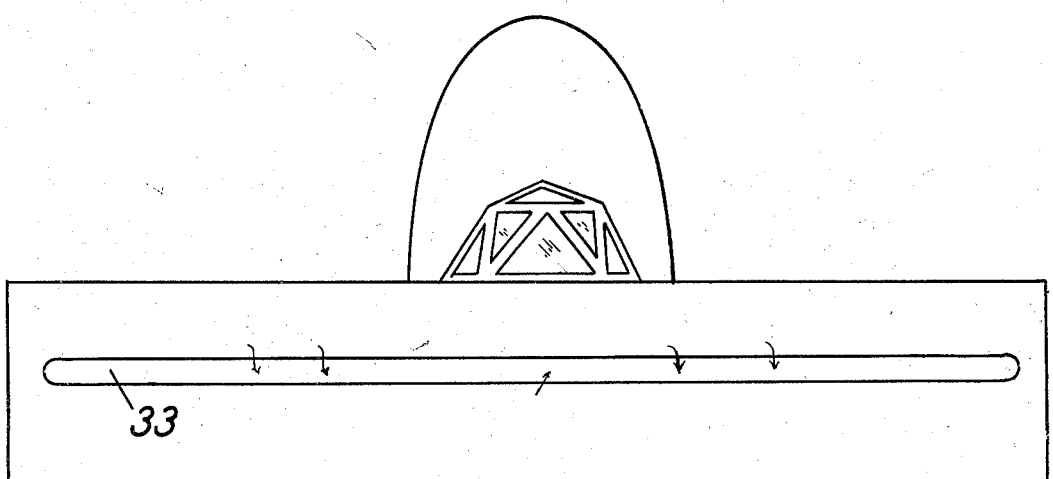

Figure 1 is a front elevation of the aircraft;
Figure 2 is a side elevation of the aircraft;
Figure 3 is a top plan of the aircraft;
Figure 4, a plan view of a wing with the covering partly removed;
Figures 5, 6 and 7 are sections of the wing taken along lines 5—5, 6—6 and 7—7 in Figure 4 respectively;
Figure 5a shows some details of the flap and its mechanism.
Figure 8 is a fragmentary vertical section taken along line 8—8 in Figure 4;
Figure 9 is a side elevation partly in section of a second form of the aircraft;
Figures 10 and 11 are side elevation and top plan, respectively, of the second form;
Figures 12 to 14 refer to the airfoil theory and geometry as described above.

Referring to Figures 1, 2 and 3, the wings are denoted by 1, the tail surfaces by 2 and the landing gear by 3. The tail booms are 4. The cabin is at the center of the span utilizing the windows 1a.

In Figure 4 the wing to one side of the longitudinal center line is shown with a portion of the covering removed to expose the airscrew 6 to view. Normally the engine 7 drives the airscrew 6 by the shaft 8 and gears 9 and 10. The airscrew is reversible as to pitch so that air may be discharged from either the upper surface slots 11, 12 and 13, or the lower surface slots 14, 15 and 16. For high speed propulsion the flow is inward at the upper surface and outward at the lower surface. This reduces the lift and provides a propulsive force as described earlier. For landing the flow is reversed by reversing the pitch of the airscrew.

Referring particularly to Figures 5 and 8, it may be observed that the wing is divided into compartments in communication with different regions of the airscrew. There are two compartments 17 and 18 communicating with the inner disk of the air screw and two other compartments 19 and 20 in communication with the outer annulus of the airscrew. The slots 12 and 15 are in communication with the compartments 17 and 18, respectively, while 11, 13 and 14, 16 are in communication, respectively, with the compartments 19 and 20.

The openings or slots 11 and 12, and 14, and 15 (see Figures 4 and 5) are placed very close together to achieve the reduction in resistance explained earlier. The jets are virtually discharged at the same locality and the jets from 12 and 15 are slower than from 11 and 14 since they come from the central portion of the airscrew where the speed of the blade elements is low.

The width $w$ of the surface slots is preferably of the order of 1 per cent of the chord of the wing section where $w$ is measured, but I find that good results are also obtainable with widths from ½ to 6 per cent of the chord. There is, however a minimum value for the slot width because the surface slows up the fluid very close to itself and the layer of fluid retarded is always about the same thickness. I find that the thickness of the jet and therefore the width of the slot should not be less than $\frac{5}{32}$ of an inch. The slots should also be formed so that the fluid discharge from them will flow tangentially along the surface. This means that the axis X of the slot should make a small angle $\epsilon$ with the surface at the opening and the surface should be well rounded. The angle $\epsilon$ should never approach 90 degrees, but shoud be less than 20 degrees.

I do not describe the gear by means of which the pitch of the airscrew may be changed since adjustable pitch propellers are now readily procurable on the market. The control of the pitch is placed near the pilot so that he may adjust the propeller from a remote locality.

To provide against high velocities in forced landings when the engine fails I arrange that the airscrew 6 may be driven by energy derived from the relative wind. A turbine 21 located in the passage 22 extending through the wing from the under surface to the upper surface conducts a high velocity stream through the passage because of the difference in pressure about the wing and this flow drives the turbine. Suitable gears 9 and 10 and the shaft 23 provide that the turbine drives the airscrew 6. Under this condition of operation it is desirable to relieve the turbine of the torque of the engine. This is accomplished by providing between the engine and the airscrew an overrunning clutch 24. The engine can then drive the airscrew but the reverse is not possible.

Although the boundary layer on the upper surface of the wing may be energized by induction into the wing, and this is best for high speed flight, for high maximum lift I prefer to discharge at the upper surface. Then rotation of the airscrew 6 under the action of the turbine 21 is such that air is inducted at the lower surface and discharged at the upper surface through the slots 11, 12 and 13. The flow of discharged fluid energizes the boundary layer and causes the wing to give a very high lift coefficient which will reduce the landing speed. Values of the lift coefficient as high as 12 are thus obtainable instead of the values of less than two now in use.

The energy for the energization of the boundary layer comes, as is evident, from the relative wind acting on the turbine. The energy and therefore the size of the turbine is less because the air is inducted at the lower surface where the pressure is large. There are two points or localities where this is especially true. One is at the so-called stagnation point where the main stream divides, part to go over the upper surface and part to follow along the under surface of the wing. The slots 14 and 15 are near this locality. The other pressure locality is just ahead of the flap 25. The slots should preferably extend over the major length of the span so as to energize the boundary layer on substantially the whole wing. In fact openings to be regarded as suitable for boundary layer energization must be openings distributed along the span, or in the limit a slot running spanwise. A local opening in a small section will not serve the purpose of energizing the boundary layer. Also the opening should not have such a large chordwise extension that it will connect regions of the surface normally having different pressures.

The airscrew shaft 6a is vertical and this orientation presents some marked advantages. It facilitates the subdivision of the wing with the minimum number of changes in direction of the flow while also making possible a few large diameter airscrews rather than a great number which would be necessary were they vertical, for instance.

The passage 22 should be of Venturi form preferably. The expansion segment commonly called the diffuser or draft tube must be formed carefully if it is to be efficient. In the conventional form the included angle $\delta$ of the diffuser cannot exceed 7 degrees without an appreciable loss in efficiency due to the failure of the flow to follow the surface of the diffuser.

The reason the flow breaks away from a greatly divergent diffuser is because of the formation of a boundary layer. I find that by suppressing the boundary layer by blowing, the diffuser may be flared to angles as large as 120 degrees. It is then possible to make the venturi short enough to fit between the upper and lower surfaces of the wing and yet be highly efficient. This is not so feasible with $\delta = 7$ degrees.

I energize the boundary layer by a jet of air blown through a peripheral slot 22a near the juncture of Venturi throat and the diffuser as illustrated in Figure 8a which is a section along the axis of the passage or venturi 22. The slot 22a has its inlet in the compartment 20 so that a source of high velocity air is available to force a jet or sheet of fluid along the diffuser wall near the locality of greatest curvature. The boundary layer is thus energized and the flow follows the diffuser walls.

To further increase the lift at landing I provide means to increase the camber. A trailing edge flap 25 (Figure 5) is rotatable downward into the position 25a and effects an appreciable arching of the mean camber arc so that the energization of the boundary layer is applied to a wing section for which it is particularly suited. The flap extends spanwise as shown dotted in Figure 4. I designate any flaps extending along the span as wing edge flaps, and those in the lower surface only as lower surface wing edge flaps.

The location of the slot 16 just ahead of the flap, that is, in the concavity formed by depressing the flap, serves to supply the airscrew 6 with air at an appreciable pressure. The retardation due to the depressed flap causes the increased pressure.

I accomplish the rotation of the flap by fluid pressure applied to a piston 26 within a cylinder 27. See Figures 5 and 5a. The fluid is supplied through two headers 28 and 29 shown only in Figure 5a. These headers extend spanwise in the wing to serve a number of cylinders 27 stationed along the span.

The fluid is preferably air under less than atmospheric pressure as provided by the intake manifold 7a in Figure 8 with which the header communicates. When the engine throttle is closed the greater suction in the manifold will cause the flap 25 to be depressed automatically. For manual control the header 28 can be attached to a source of positive pressure such as the oil pump or the cylinder and a control valve placed near the pilot. The manual control is not shown in the drawings.

A connecting rod 30 and lever 31 serve to transfer the piston force into a torque about the flap shaft 32.

In the propulsion of wings such as I have just described I prefer certain other qualities in addition to those already described. In particular I prefer thick wing sections in the central portion of the span, in fact thicker sections than have been used or proposed heretofore. A thick section where the nose is well rounded as indicated in Figure 13 will give higher lift coefficients for the same input of energy than a thin section. By locating the horizontal air-screws 6 at this thick location ample room is provided above and below for the ingress and egress of the pumped fluid. The airscrews are then near the turbines 21 which should be located near the central portion. Thus the whole power plant may be compactly arranged which facilitates its control and maintenance. Then by making the wing tapered the increasing volume of flow toward the airscrews is cared for by the increasing cross section of the wing interior which conducts the flow. A good range of thicknesses $t$ lies between 20 per cent and 60 per cent of the chord with a preferred value of 48 per cent. With great thickness I find that a large value of the camber $h$ should be used. With the preferred thickness I prefer a value of $h$ from 9.0 to 20 per cent for the convex wing section. Also the thicker the section the greater is the angle $\phi$ for a given value $h$ which latter value largely determines the range of angles through which the wing would have to be rotated bodily if the negative circulation were not employed. With large values of $\phi$ as pointed out earlier a greater negative circulation is available. Hence a greater $\phi$, or thickness, or both should accompany a greater value $h$.

With a conventional wing the angle between the ground line and the zero lift line is less than $$\alpha_2 = \frac{3.4}{R}(\pi R + 5.35)(0.9 + 9h) + 4 \qquad (9)$$

in degrees. In the aircraft I describe (see Figure 2) $\alpha_2$ is made larger than the value of Equation (9). But the value of $\alpha_2$ should not exceed the ultimate maximum lift obtainable from a wing. The ultimate value is given by $$\alpha_m = \frac{\pi R + 5.35}{5.35 \pi R} 4\pi \text{ radians} \qquad (10)$$

$$= \frac{43}{R}(\pi R + 5.35) \qquad (11)$$

in degrees, since in the limit $C_L$ max. will equal $4\pi$. Where the wing is tapered the zero lift line is to be determined at the mean aerodynamic chord. The procedure of the determination is well known and may be found in the Aircraft Handbook by Warner and Johnson.

The segregation of the propulsive jets of different velocities may be effected also in the case of a fuselage. I show this version in Figures 9, 10 and 11.

The airscrew 6a draws air from the slot 33 in the wing and from the slot 34 in the fuselage. The inducted air passes in part through the outer annulus of the blade defined by the passage 35 extending peripherally about the fuselage. The exit of this passage is 36, a peripheral slot extending around the fuselage. Other slots 37 and 37a discharge the air from the central portion of the airscrew. In particular slot exit 37a is close to the exit 36 so that the high speed jet does not proceed far without having the lower speed jet between it and the body surface. The body resistance is thus maintained at a low value as previously described.

The total pressure of a fluid is the sum of the static and dynamic pressures and I sometimes prefer to characterize the flows in this manner rather than by velocity because a very attenuated stratum of air moving with a high velocity may have a very low propulsive effect. If the total pressure is stated this difficulty is suppressed because there is a definite relation between the static pressure and therefore the density of the air (gas) and the velocity, both for a given temperature. That is, it is well known according to Bernoulli's equation that static and dynamic pressure are mutually convertible by changing the cross section of the conduit carrying the flow.

The fluid coming from the central region of an airscrew has a lower total pressure than that from an annulus near the tips. If each fluid is passed through a tube of varying cross section, the relation of the fluid velocities could be inverted but the total pressures would remain the same. That is, the fluid from the central region might be passed through a nozzle which would speed up the flow while the fluid from the tip annulus might be passed through a tube of expanding cross sectional area so that the velocity was decreased. Although the latter velocity might be made even less than that of the fluid from the central region the total heads would still have their initial ratio.

The stipulations regarding total heads also serve to differentiate between flows through the aircraft surfaces due to the pressure of the relative wind. Such flows would have the same total pressure since they are all derived from the atmospheric pressure and the dynamic pressure $$\frac{\rho V^2}{2}$$

due to the mass density $\rho$ and the speed of flight V, as is well known.

I use the term body broadly to indicate any part of the aircraft such as a wing or fuselage for instance.

I define a wing as any body capable of creating a force transverse to the relative flow of fluid—and this irrespective of the use. The surface on the side of the wing to which the transverse force points I call the upper surface and a flow in the direction of the force I call a vertical flow. I do not limit myself to fixed wings.

It is customary to refer to wings rotatable in air about an axis and oriented so that they may be considered as parts of helical surfaces as airscrews. I use the term fluid-screw to indicate all such devices whether they work in air or other mediums.

While the form of apparatus herein described constitutes a preferred embodiment of the invention it is to be understood that the invention is not limited to these precise forms of apparatus, and that changes may be made therein without departing from the scope of the invention which is defined in the appended claims.

I claim:

1. In an aircraft, a rotary blower emitting fluid streams of different total pressure, a perforated exterior wall of the aircraft to form a plurality of openings in close longitudinal proximity, means of communication between the said blower and the plurality of openings to distribute the fluid of different pressures to different openings of said plurality of openings so that the resultant flow about the aircraft aft of the said openings is stratified as to velocity.

2. In an aircraft, an aircraft body having a plurality of openings in the surface in close longitudinal proximity to each other and formed to discharge fluid along the surface, and a principal means of propulsion comprising a propulsive means of blowing emitting streams of different total pressure and directing a major portion of the blown fluid into the interior of the aircraft, said means of blowing cooperating with the said openings to discharge fluid streams along the body surface so that the resultant flow is stratified as to velocity outward from the body to serve the dual purpose of reducing the resistance to flight and to propel the aircraft principally by the mass reaction of the discharge streams.

3. In an aircraft, a wing having a divided lower surface to form a plurality of rearward directed openings distributed spanwise formed to discharge fluid rearward more along than vertically to the surface, a perforated side surface of the aircraft for induction of the boundary layer, a means of blowing, and means of communication between the means of blowing and the said surface openings so that fluid jets are dischargeable along the lower surface of the wing and stratified as to velocity outward from the surface.

4. In an aircraft, a principal means of propulsion to propel the aircraft and to reduce the wind resistance even of its streamline bodies comprising a means of blowing emitting streams of different total pressure and a prime mover to actuate it, said means of blowing discharging a major portion of its blown fluid into the aircraft interior, and a wing having a perforated surface to form a plurality of rearward directed openings in communication with the wing interior extended spanwise and in close longitudinal proximity, said means of blowing and said openings cooperating so that fluid jets are dischargeable rearward along the surface from the openings with the fluid of least velocity adjacent the surface of the aircraft.

5. In combination with a wing, a wing section whose maximum thickness is greater than 20 per cent of the chord and whose maximum mean camber ordinate is greater than 10 per cent of the chord, said wing having a perforated lower surface to form a plurality of openings in communication with the wing interior, said openings being extended spanwise, a means of blowing emitting fluid streams of different total pressure, and means of communication between the means of blowing and the said openings so that fluid streams are dischargeable from the said openings in strata of velocities varying in magnitude outward from the wing surface.

6. In an aircraft, a blower means capable of emitting fluid quantities of different total pressure, a perforated exterior wall of the aircraft to form a plurality of openings in different regions of the said wall, and a plurality of means of communication between the blower means and the plurality of openings so that streams of fluid of different total pressure are dischargeable at different regions of the aircraft wall.

7. In an aircraft, a fuselage having a surface perforated to form a plurality of openings extending around a substantial portion of the perimeter transverse to the direction of flight, a means of blowing providing fluid sources of different total pressures, a plurality of means of communication between the said sources and the said plurality of openings, so as to segregate the flows of different velocity and to provide that the fuselage at least in part is immersed in a flow stratified as to velocity.

8. In an aircraft, a wing, a rotary blower providing fluid sources of different total pressure, said wing having a perforated surface to provide a plurality of openings, a plurality of means of communication between the rotary blower and said openings to carry fluid of different total pressures so that fluid streams are dischargeable along the wing surface with a stratification as to velocity outward from the surface.

9. In an aircraft, a rotatable fluidscrew emitting fluid streams of different velocities from different regions of its plane of rotation, a perforated exterior wall of the aircraft to form a plurality of openings, a plurality of means of communication between a plurality of the said regions of the fluidscrew and the said plurality of openings so that streams of different velocity are dischargeable from different openings.

10. In an aircraft, a wing having an opening in its surface, a means of blowing operable by the relative wind to cause a flow of fluid through the opening to energize the boundary layer and thereby provide a high lifting capacity for landing, and a prime mover to actuate said means of blowing to cause the flow of a mass of fluid through the said surface opening to propel the aircraft, said prime mover and means of blowing constituting the principal means of propulsion.

11. In an aircraft, a wing having an opening in its surface, a means of blowing operable by the relative wind to cause a flow of fluid through the opening to energize the boundary layer and thereby provide a high lifting capacity for landing, a perforated surface of the aircraft to provide an opening, and a principal means of propulsion comprising said means of blowing housed within the aircraft and a prime mover to actuate it, means of communication between the wing surface opening and the aircraft surface opening through the means of blowing so that a fluid jet is creatable to provide a thrust and to reduce the resistance by energizing the boundary layer.

12. In an aircraft, a wing having perforated upper and lower surfaces to form in both spanwise slots in the forward two-thirds of the wing and a wing section such that the contour aft of the middle of the chord turns from the rearward flow out the lower surface slot to give the said flow a final upward component of velocity, a principal means of propulsion comprising a means of blowing and means of communication between the means of blowing and the said surface slots so that a fluid jet is dischargeable rearward at least from the lower surface slot to serve the triple purpose of energizing the boundary layer to reduce the drag, to create a thrust, and to reduce the effective angle of attack for high speed flight.

13. In an aircraft, a wing having perforated upper and lower surfaces to form in both spanwise slots in close longitudinal proximity in the forward two-thirds of the wing and a wing section such that the contour aft of the middle of the chord turns from the rearward flow dischargeable from a said lower surface slot to give the said flow a final upward component of velocity, and a means of blowing in communication with the said surface slots to discharge fluid jets at least from the lower surface slots of different velocities so that they are stratified as to velocity outward from the surface.

14. In an aircraft, a wing having perforated upper and lower surfaces to form in both spanwise slots in the forward two-thirds of the wing and a wing section such that the lower surface contour aft of the middle of the chord turns from the rearward flow out the lower surface slot to give the said flow a final upward component of velocity, and a means of blowing in communication with the upper and lower surface slots to provide the said flow.

15. In an aircraft, a landing gear, a wing to support the aircraft and having a lower surface slot directed rearward and in communication with the wing interior, said wing having a wing edge flap operable at landing and a perforated upper surface to form a spanwise opening and means to direct a flow therethrough to energize the boundary layer and thereby provide in cooperation with said flap a high lifting capacity for landing, said wing being set relative to the landing gear so that the angle between the zero lift line and the ground in degrees lies between $$\alpha_2 = \frac{3.4}{R}(\pi R + 5.35)(0.9 + 9h) + 4$$

and $$\alpha_m = \frac{43}{R}(\pi R + 5.35)$$

for the product $Rh$ equal to or greater than 0.40, and means to make feasible high speed flight without a large negative rotation of the wing comprising a means of blowing and a prime mover to operate it, and means of communication between the means of blowing and the said slot so that a fluid jet is dischargeable to set up a negative circulation to reduce the effective angle of attack for high speed flight.

16. In an aircraft, a wing having an upper and a lower surface slot, said slots extending along the span for use in energizing the boundary layer, a fluidscrew operable to motivate fluid, means of communication between the fluidscrew and the said slots so that the fluidscrew can move fluid from one slot to the other, and means to reverse the pitch of the said fluidscrew to energize the boundary layer on either surface by induction.

17. In combination with a wing having a hollow interior and associated with a relative wind, a divided upper surface to form a spanwise discharge slot, a divided lower surface to form an inlet opening, a means of pumping actuated by the relative wind, means of communication between the inlet opening and the discharge slot through the means of pumping so that the latter may induct air at the inlet opening and discharge it rearward at the upper slot to energize the boundary layer and thereby augment the lifting capacity.

18. In an aircraft, a wing having perforated upper and lower surfaces to form in both spanwise slots in the forward two-thirds of the wing, said wing flying horizontally normally at high speed at a large angle of attack relative to the horizon, a wing section such that the lower contour aft of the mid point of the chord turns from a rearward flow dischargeable out the lower surface slot to give the said flow a final upward component of velocity, a wing edge flap on the wing operable at landing to convert the wing section to a more suitable one for boundary layer energization, means to direct a flow through the upper surface slot to energize the boundary layer and create an augmentation of the lift at landing, and a means of blowing in communication with the said surface slots and a prime mover to actuate it so that a fluid jet is dischargeable rearward at least from the lower surface slot to provide a thrust and create a negative circulation about the wing to reduce its effective angle of attack for high speed flight.

19. In combination, a wing associated with a relative flow of fluid and having a divided upper wall of the wing to form a spanwise opening in communication with the wing interior and suitable for energizing the boundary layer, a blower operating to cause a flow through the opening, and means to reverse the direction of flow through the opening by the blower's operation.

20. In combination with a wing having divided upper and lower exterior walls to form openings in communication with the wing interior, the openings of at least one wall being formed to discharge fluid more along than normal to the wall surface, a means of blowing in communication with the openings to cause a flow therethrough, and means to reverse the said flow through the openings in opposite walls of the wing.

21. In combination with a wing associated with a relative flow of fluid, a conduit having an expanding cross section and extending from the under surface through the wing so that the fluid pressure difference about the wing induces a flow through the conduit, said conduit having a perforated wall to form an opening therein, means to cause a flow through said opening into the conduit and substantially tangentially to said conduit walls, and a turbine in the conduit actuated by the flow therein.

22. In combination with a wing, a lower surface flap for altering the lift coefficient of the wing, said wing having a divided lower surface to form a spanwise slot along one edge of the flap in the concavity formed by depressing the flap and a divided upper surface of the wing to form a second spanwise slot in communication with the wing interior and means of communication between the said two slots.

23. In combination with a wing, a wing edge flap for altering the lift coefficient of the wing, said wing having a divided lower surface to form a spanwise slot along one edge of the flap in the concavity formed by the depression of the flap and a divided upper surface of the wing to form a second spanwise slot in communication with the wing interior, and a means of blowing to induct air at the lower surface slot and discharge it at the upper surface opening.

24. In an aircraft, a wing to support the aircraft, said wing having a lower surface perforated to form a rearward directed discharge slot and a wing section formed with a convex lower contour and a perforated upper surface of the wing to form a slot suitable for energizing the boundary layer, means to energize the boundary layer and thereby provide a high lifting capacity for landing achievable at large angles of attack, and means to reduce the lifting capacity of the wing for high speed flight without a large bodily rotation of the wing comprising a means of blowing and a prime mover to actuate it, and means of communication between the means of blowing and the lower surface slot so that a fluid jet is dischargeable to create a negative circulation to reduce the lift for high speed flight.

25. In an aircraft, a wing having a perforated lower surface to form a plurality of rearward directed spanwise slots in communication with the wing interior, and a means of blowing emitting a plurality of fluid streams of different total pressures, said means cooperating with the said slots to discharge a plurality of streams therefrom with a stratification of velocity outward from the lower surface.

EDWARD A. STALKER.